US009073501B2

(12) United States Patent
Allen et al.

(10) Patent No.: US 9,073,501 B2
(45) Date of Patent: Jul. 7, 2015

(54) ROLLER ASSEMBLY FOR AUTONOMOUS MOBILE ROBOTS

(71) Applicant: Harvest Automation, Inc., Billerica, MA (US)

(72) Inventors: Seth Allen, Manchester, NH (US); Michael Bush, Arlington, MA (US)

(73) Assignee: Harvest Automation, Inc., Billerica, MA (US)

( * ) Notice: Subject to any disclaimer, the term of this patent is extended or adjusted under 35 U.S.C. 154(b) by 0 days.

(21) Appl. No.: 14/478,736

(22) Filed: Sep. 5, 2014

(65) Prior Publication Data
US 2015/0066281 A1     Mar. 5, 2015

Related U.S. Application Data

(60) Provisional application No. 61/874,097, filed on Sep. 5, 2013.

(51) Int. Cl.
| B60R 19/16 | (2006.01) |
| B60R 19/22 | (2006.01) |
| B25J 5/00 | (2006.01) |
| B25J 19/06 | (2006.01) |
| B25J 19/00 | (2006.01) |

(52) U.S. Cl.
CPC .............. *B60R 19/16* (2013.01); *B60R 19/22* (2013.01); *B25J 5/00* (2013.01); *B25J 19/06* (2013.01); *B25J 19/0091* (2013.01); *Y10S 901/01* (2013.01); *Y10S 901/49* (2013.01)

(58) Field of Classification Search
CPC ............ B60R 19/16; B60R 19/22; B25J 5/00; B25J 19/0091; B25J 19/06; Y10S 901/49; Y10S 901/01

USPC .......................................................... 701/23
See application file for complete search history.

(56) References Cited

U.S. PATENT DOCUMENTS

| 2008/0276407 A1* | 11/2008 | Schnittman et al. ............ 15/319 |
| 2009/0016656 A1 | 1/2009 | Blair et al. |
| 2011/0301757 A1 | 12/2011 | Jones et al. |
| 2012/0034833 A1 | 2/2012 | Schaube et al. |

FOREIGN PATENT DOCUMENTS

| EP | 1092891 A2 | 4/2001 |
| JP | 07-036302 | 2/1995 |

OTHER PUBLICATIONS

Progressive Turf Equipment Inc. "Pro-Flex Roller 120 Contour Finishing Mower," advertising flyer, www.progrssiveturfequip.com, no date available.
International Search Report and Written Opinion for PCT/US2014/054340, dated Dec. 15, 2014.

* cited by examiner

*Primary Examiner* — Mary Cheung
*Assistant Examiner* — Yuen Wong
(74) *Attorney, Agent, or Firm* — Rajesh Vallabh; Foley Hoag LLP

(57) ABSTRACT

A roller assembly provides collision protection and stability to a mobile robot. The roller assembly includes a shaft forming an axis about which the roller assembly can rotate. The shaft has opposite ends configured to be supported by bearings in the robot. The roller assembly also includes an impact absorbing layer coaxially covering the shaft. It further includes a shell coaxially covering the impact absorbing layer having a lower coefficient of friction than the impact absorbing layer for providing low sliding friction.

29 Claims, 3 Drawing Sheets

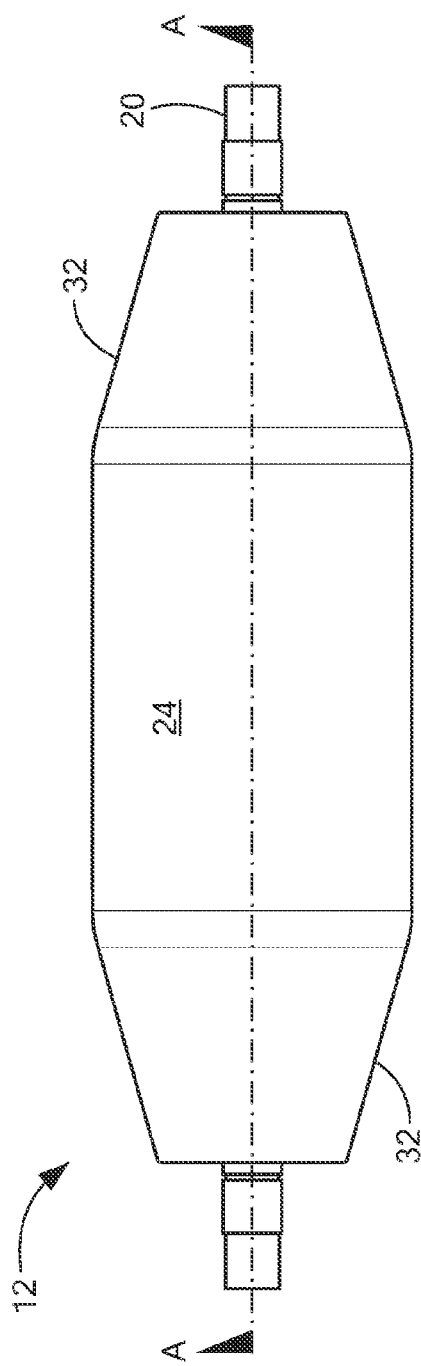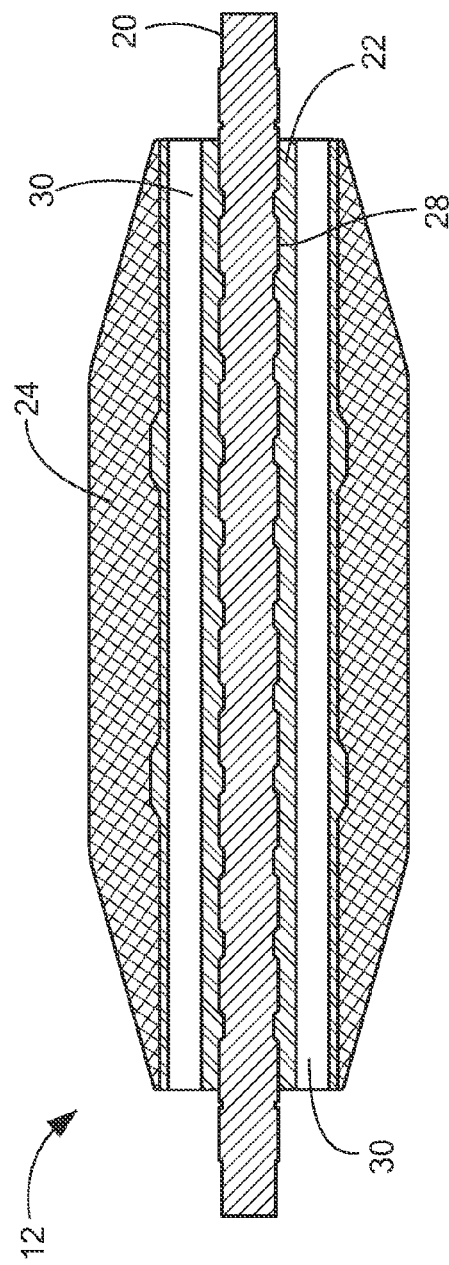
FIG. 2C
FIG. 2D

ROLLER ASSEMBLY FOR AUTONOMOUS MOBILE ROBOTS

CROSS REFERENCE TO RELATED APPLICATION

This application claims priority from U.S. Provisional Patent Application No. 61/874,097 filed on Sep. 5, 3013 entitled ROLLER ASSEMBLY FOR AUTONOMOUS MOBILE ROBOTS, which is hereby incorporated by reference.

BACKGROUND

The present application relates generally to autonomous mobile robots and, more particularly, to a roller assembly for supporting the robot during movement and providing protection from collisions.

BRIEF SUMMARY

A roller assembly in accordance with one or more embodiments provides collision protection and stability to a mobile robot. The roller assembly includes a shaft forming an axis about which the roller assembly can rotate. The shaft has opposite ends configured to be supported by bearings in the robot. The roller assembly also includes an impact absorbing layer coaxially covering the shaft. It also includes a shell coaxially covering the impact absorbing layer having a lower coefficient of friction than the impact absorbing layer for providing low sliding friction.

A mobile robot in accordance with one or more embodiments includes a chassis, a drive subsystem for maneuvering the chassis, a controller on the chassis for controlling the drive subsystem, and a roller assembly for providing collision protection and stability to a mobile robot. The roller assembly includes a shaft forming an axis about which the roller assembly can rotate. The shaft has opposite ends supported by bearings in the chassis. The roller assembly also includes an impact absorbing layer coaxially covering the shaft. It also includes a shell coaxially covering the impact absorbing layer having a lower coefficient of friction than the impact absorbing layer for providing low sliding friction.

BRIEF DESCRIPTION OF THE DRAWINGS

FIGS. 2A-2D are perspective, side, front, and cross-section views, respectively, of the roller assembly shown in FIG. 1.

DETAILED DESCRIPTION

Autonomous mobile robots are used in a variety of industries, including in the agricultural industry. For example, one particular use of autonomous robots is for performing automated potted plant processing operations. Specifically, robots can be used to identify, pick up, transport, and deposit container-holding plants as disclosed in co-pending U.S. patent application Ser. No. 12/378,612 filed on Feb. 18, 2009 and entitled ADAPTABLE CONTAINER HANDLING SYSTEM and U.S. patent application Ser. No. 13/100,763 filed on May 4, 2011 and entitled ADAPTABLE CONTAINER HANDLING ROBOT WITH BOUNDARY SENSING SUBSYSTEM.

Figure 1:
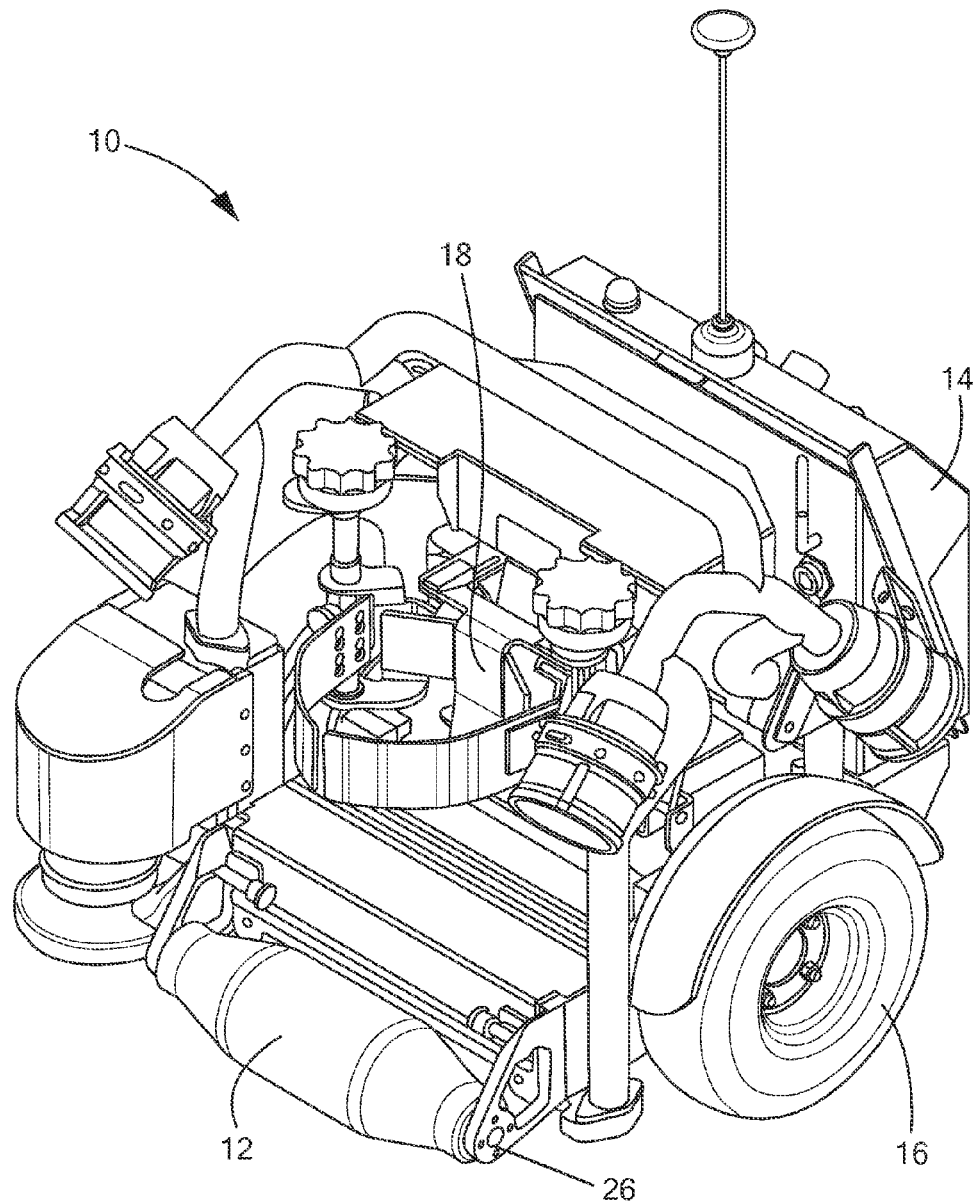
FIG. 1 is a perspective view of an exemplary autonomous mobile robot equipped with a roller assembly in accordance with one or more embodiments.
Figure 2A:
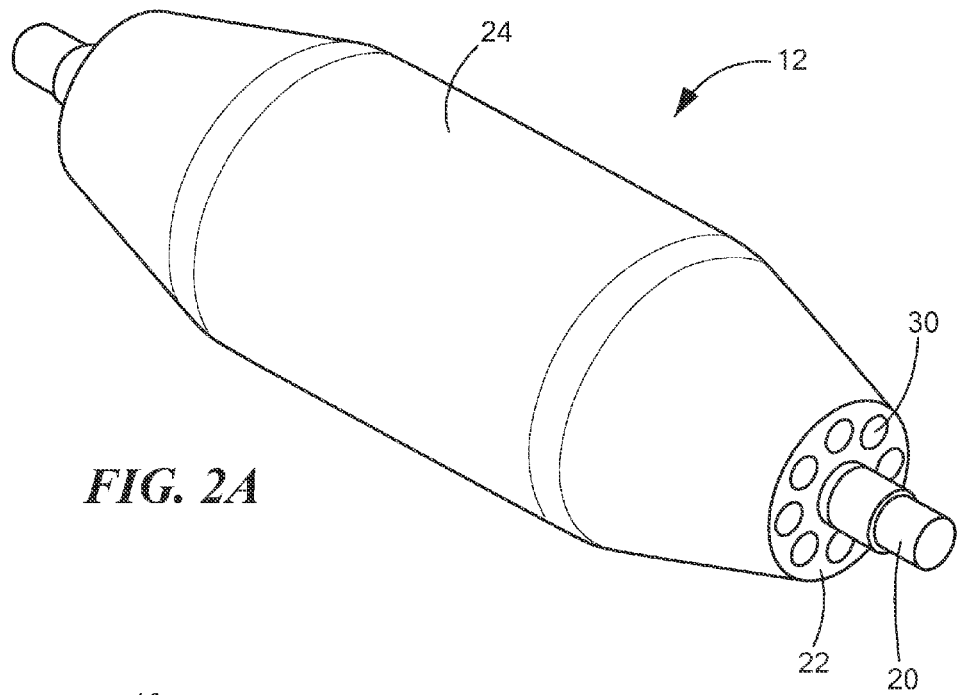
Figure 2B:
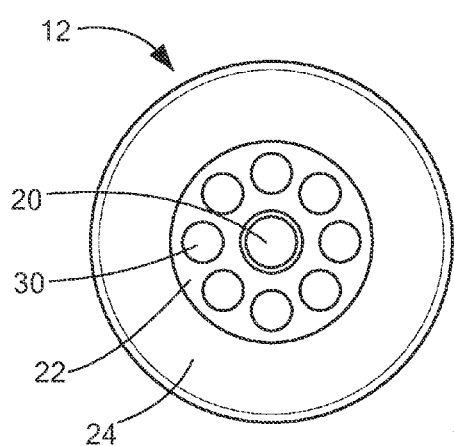

FIG. 1 illustrates an exemplary autonomous mobile robot 10 equipped with a roller assembly 12 in accordance with one or more embodiments. The robot 10 also includes a microprocessor-based controller subsystem 14 for controlling overall operation of the robot 10. In the exemplary robot 10, the controller subsystem 14 is configured or programmed to cause the robot 10 to perform various functions such as, e.g., picking up, transporting, and depositing potted plants. The robot 10 also includes a drive subsystem 16 (which is controlled by the controller subsystem 14) for maneuvering the robot 10. The drive subsystem 16 can comprise a differential drive including two coaxial wheels. The robot 10 also includes a gripper assembly 18, which allows the robot 10 to grab objects such as, e.g., plant containers, secure them during transport, and then place the containers in various spacing patterns.

The roller assembly 12, mounted in this example at the front end of the robot 10, supports and provides stability to the robot 10 during movement. The roller assembly 12 also provides collision protection for the robot 10.

The roller assembly 12 can be mounted at the front or back (or both front and back) of the robot 10 and supports the robot 10 as the robot 10 rolls forwards and backwards with low resistance to movement. The roller assembly 12 also slides over the ground or uneven terrain as the robot 10 turns in place also with low resistance.

The roller assembly 12 thereby can support a robot 10 to give it static stability. In addition, because it has low resistance to movement, the roller assembly 12 enables movement without direct steering or pivoting about an axis like a caster.

Robots can operate at high speeds and can be significantly damaged from impact with other robots or objects. The roller assembly 12 cushions against both small and violent impacts to avoid significant damage to the robot.

The roller assembly 12 is low in profile to allow other robot mechanisms like the gripper assembly 18 to work over the top of the roller assembly 12 such that the roller assembly 12 is out of the work envelope of the gripper system 18.

The roller assembly 12 is robust enough to survive violent collisions, yet compliant enough to cushion the ride of the robot 10 when rolling over modest bumps.

As shown in FIGS. 2A-2D, a roller assembly 12 in accordance with one or more embodiments includes a metal shaft 20 covered coaxially by a layer of elastomer material (or other impact absorbing material) 22, which in turn is covered coaxially by an outer shell 24.

The metal shaft 20 has opposite ends that can be inserted into and supported by bearings 26 (shown in FIG. 1). The shaft 20 provides an axis about which the elastomer 22 and outer shell 24 can rotate. In one or more embodiments, the metal shaft 20 includes a plurality of features 28 along the length thereof to engage and securely retain the elastomer layer. The elastomer layer 22 can be molded or cast on the metal shaft 20. Other methods of attaching the elastomer layer 22 to the shaft 20 are also possible.

The elastomer layer 22 absorbs impact and can include one or more open volumes (voids 30) extending along the length of the elastomer layer 22, enabling significant deformation under high force and reducing stiffness of the device. Alternately, the elastomer layer 22 can be a foamed material having built-in voids.

The opposite ends 32 of the outer shell 24 are preferably tapered to enable the robot 10 to more easily turn in place.

The outer shell 24 can be made of plastic or some other material providing a slippery outer surface or having a low coefficient of friction. The outer shell 24 is slippery for low sliding friction and allows turning easily and rolls easily.

In some embodiments, the outer shell 24 is preferably made of plastic or other material providing limited stiffness under impact. In other embodiments, the outer shell 24 is made of materials providing additional stiffness to the roller assembly 12.

A variety of different materials could be substituted in the shaft 20, elastomer 22, and shell 24 to obtain suitable properties for a given application. For example, the elastomer layer may be replaced by a non-elastomer spring to absorb impact. By way of example, a non-elastomer spring comprising a wire wound spring could be used. Alternatively, the elastomer layer may be replaced by a gas bladder spring.

Material properties can be altered to scale the device depending on mass and impact speed ranges. The spring should be made of a material that does not exhibit long term creep under modest load.

The roller assembly 12 can be implemented in a variety of mobile equipment other than mobile robots. For example, it can be used in material handling equipment (such as fork trucks and pallet jacks), unmanned ground vehicles (UGVs), and zero turn mowers.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. A roller assembly for providing collision protection and stability to a mobile robot, comprising:
   a shaft forming an axis about which the roller assembly can rotate, said shaft having opposite ends configured to be supported by bearings in the mobile robot;
   an impact absorbing layer coaxially covering the shaft; and
   a shell coaxially covering the impact absorbing layer having a lower coefficient of friction than the impact absorbing layer for providing low sliding friction.

2. The roller assembly of claim 1, wherein the shaft comprises a center portion between the opposite ends, and wherein the impact absorbing layer and the shell coaxially cover the center portion of the shaft.

3. The roller assembly of claim 1, wherein the outer shell is tapered at opposite ends thereof to enable the mobile robot to more easily turn in place.

4. The roller assembly of claim 1, wherein the shaft includes a plurality of features along the length thereof to engage and securely retain the impact absorbing layer.

5. The roller assembly of claim 1, wherein the impact absorbing layer is molded or cast on the shaft.

6. The roller assembly of claim 1, wherein the impact absorbing layer includes one or more open volumes extending along the length thereof for enabling deformation thereof and reducing stiffness.

7. The roller assembly of claim 1, wherein the impact absorbing layer comprises a foamed material having built-in voids.

8. The roller assembly of claim 1, wherein the impact absorbing layer comprises an elastomer layer.

9. The roller assembly of claim 1, wherein the impact absorbing layer comprises an a wire wound spring or a gas bladder spring.

10. The roller assembly of claim 1, wherein the shaft comprises metal.

11. The roller assembly of claim 1, wherein the outer shell comprises a plastic material.

12. The roller assembly of claim 1, wherein the outer shell comprises a material providing a slippery outer surface.

13. The roller assembly of claim 1, wherein the outer shell comprises a material for reducing stiffness of the roller assembly.

14. The roller assembly of claim 1, wherein the outer shell comprises a material for increasing stiffness of the roller assembly.

15. A mobile robot, comprising:
   a chassis;
   a drive subsystem for maneuvering the chassis;
   a controller on the chassis for controlling the drive subsystem; and
   a roller assembly for providing collision protection and stability to the mobile robot, the roller assembly comprising:
   a shaft forming an axis about which the roller assembly can rotate, said shaft having opposite ends supported by bearings on the chassis;
   an impact absorbing layer coaxially covering the shaft; and
   a shell coaxially covering the impact absorbing layer having a lower coefficient of friction than the impact absorbing layer for providing low sliding friction.

16. The mobile robot of claim 15, further comprising a gripper assembly on the chassis for grabbing and holding an object to be transported by the mobile robot, wherein the roller assembly is positioned outside of a work envelope of the gripper assembly.

17. The mobile robot of claim 15, wherein the shaft of the roller assembly comprises a center portion between the opposite ends, and wherein the impact absorbing layer and the shell coaxially cover the center portion of the shaft.

18. The mobile robot of claim 15, wherein the outer shell of the roller assembly is tapered at opposite ends thereof to enable the mobile robot to more easily turn in place.

19. The mobile robot of claim 15, wherein the shaft of the roller assembly includes a plurality of features along the length thereof to engage and securely retain the impact absorbing layer.

20. The mobile robot of claim 15, wherein the impact absorbing layer of the roller assembly is molded or cast on the shaft.

21. The mobile robot of claim 15, wherein the impact absorbing layer of the roller assembly includes one or more open volumes extending along the length thereof for enabling deformation thereof and reducing stiffness.

22. The mobile robot of claim 15, wherein the impact absorbing layer of the roller assembly comprises a foamed material having built-in voids.

23. The mobile robot of claim 15, wherein the impact absorbing layer of the roller assembly comprises an elastomer layer.

24. The mobile robot of claim 15, wherein the impact absorbing layer of the roller assembly comprises an a wire wound spring or a gas bladder spring.

25. The mobile robot of claim 15, wherein the shaft of the roller assembly comprises metal.

26. The mobile robot of claim 15, wherein the outer shell of the roller assembly comprises a plastic material.

27. The mobile robot of claim 15, wherein the outer shell of the roller assembly comprises a material providing a slippery outer surface.

28. The mobile robot of claim 15, wherein the outer shell of the roller assembly comprises a material for reducing stiffness of the roller assembly.

29. The mobile robot of claim 15, wherein the outer shell comprises a material for increasing stiffness of the roller assembly.

* * * * *